(12) United States Patent
Sugano (10) Patent No.: US 7,257,478 B2
(45) Date of Patent: Aug. 14, 2007

(54) VEHICLE DRIVING CONTROL DEVICE (75) Inventor: Takeshi Sugano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 193 days.

(21) Appl. No.: 11/010,448

(22) Filed: Dec. 14, 2004

(65) Prior Publication Data

US 2005/0159876 A1 Jul. 21, 2005

(30) Foreign Application Priority Data

Jan. 21, 2004 (JP) .............................. 2004-012875

(51) Int. Cl.
*G06F 7/00* (2006.01)
*G01S 13/04* (2006.01)

(52) U.S. Cl. .......................... 701/96; 701/301; 701/70; 340/435; 340/436; 180/170; 342/69; 342/71

(58) Field of Classification Search .................. 701/41, 701/96, 70, 301–302; 340/435–438, 903–904; 180/167–170; 342/69–71; 303/121
See application file for complete search history.

(56) References Cited

U.S. PATENT DOCUMENTS 6,053,268 A    4/2000   Yamada
6,311,120 B1   10/2001  Asada
6,311,123 B1 * 10/2001  Nakamura et al. ............ 701/96
6,993,425 B2 *  1/2006  Tange et al. ................. 701/96

FOREIGN PATENT DOCUMENTS

| DE | 19842827 A1 | 3/2000 |
| EP | 1396833 A | 3/2004 |
| JP | S63-14343U U | 9/1988 |
| JP | H10-109564 A | 4/1998 |
| JP | H10-208047 | 8/1998 |
| JP | H11-034829 A | 2/1999 |
| JP | 2000-071807 A | 7/2000 |
| JP | P2000-309257 A | 11/2000 |
| JP | 2003-151095 A | 5/2003 |
| JP | 2003-306136 A | 10/2003 |
| JP | 2004-188996 A | 7/2004 |
| JP | 2005-145153 A | 6/2005 |

* cited by examiner

Primary Examiner—Yonel Beaulieu
(74) Attorney, Agent, or Firm—Global IP Counselors, LLP (57) ABSTRACT A vehicle driving control device is configured to improve response to driver braking operation and shorten the free running distance. The vehicle driving control device processes an image showing an area ahead of the host vehicle to recognize a preceding vehicle in the host vehicle lane, and then determines whether or not the preceding vehicle is making a sudden lateral movement based on this image processing result. If the vehicle driving control device determines that the preceding vehicle is making a sudden lateral movement, then a preliminary braking force is generated.

20 Claims, 10 Drawing Sheets

VEHICLE DRIVING CONTROL DEVICE

CROSS-REFERENCE TO RELATED APPLICATIONS

This application claims priority to Japanese Patent Application No. 2004-012875. The entire disclosure of Japanese Patent Application No. 2004-012875 is hereby incorporated herein by reference.

BACKGROUND OF THE INVENTION

1. Field of the Invention

The present invention relates to a vehicle driving control device that generates a preliminary braking force prior to operation of the brakes by the driver, thereby improving response to brake operation by the driver and shortening the free running distance.

2. Background Information

In recent years, many vehicles have been equipped with various automatic speed control technologies. For example, an adaptive cruise control system has been disclosed in U.S. Pat. No. 6,311,120 that is capable of executing a following control function. In such an automatic speed control device, when a host vehicle (an ACC vehicle) is traveling in a following control mode in which a host vehicle (an ACC vehicle) is automatically follow a preceding vehicle, the automatic speed control device maintains the host vehicle's distance from the preceding vehicle at a desired inter-vehicle distance. In particular, the automatic speed control device controls the host vehicle's speed so that the host vehicle is automatically accelerated or decelerated.

There is also known a preliminary braking force control device that generates a preliminary braking force prior to operation of the brakes by the driver, thereby improving response to brake operation by the driver and shortening the free running distance. One such preliminary braking force control device is disclosed in Japanese Laid-Open Patent Application No. 2000-309257.

In view of the above, it will be apparent to those skilled in the art from this disclosure that there exists a need for an improved vehicle driving control device. This invention addresses this need in the art as well as other needs, which will become apparent to those skilled in the art from this disclosure.

SUMMARY OF THE INVENTION

It has been discovered that in the above-mentioned preliminary braking force control device, the preliminary braking force is generated whenever the distance between vehicles drops below a prescribed distance, or whenever a target deceleration exceeds a set value. Thus, a problem arises in that when a preceding vehicle suddenly swerves to avoid an obstacle during preceding vehicle following control, an inter-vehicle distance sensor cannot generate a preliminary braking force by the time the obstacle can be recognized.

In view of this problem, the lateral position of a preceding vehicle in the host vehicle lane is detected to determine if the preceding vehicle is making a sudden lateral movement based on this detection result. If it has been determined that the preceding vehicle is making a sudden lateral movement, then the preliminary braking force is generated.

With the present invention, when a preceding vehicle makes a sudden lateral movement in order to avoid an obstacle, the preliminary braking force is already applied before the driver of the host vehicle sees the obstacle and operates the brakes. This allows a powerful braking force to be generated immediately even when the brakes are not operated suddenly. According, the free running distance can be quickly shortened.

In accordance with one aspect of the present invention, a vehicle driving control device comprises a preceding vehicle detection section, a lateral movement determination section and a preliminary braking force control section. The preceding vehicle detection section is configured to detect a lateral position of a preceding vehicle in a host vehicle lane. The lateral movement determination section is configured to determine if the preceding vehicle detected by the preceding vehicle detection section is making a sudden lateral movement based on the lateral position detected by the preceding vehicle detection section. The preliminary braking force control section is configured to generate a preliminary braking force upon determination by the lateral movement determination section that the preceding vehicle is making the sudden lateral movement.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
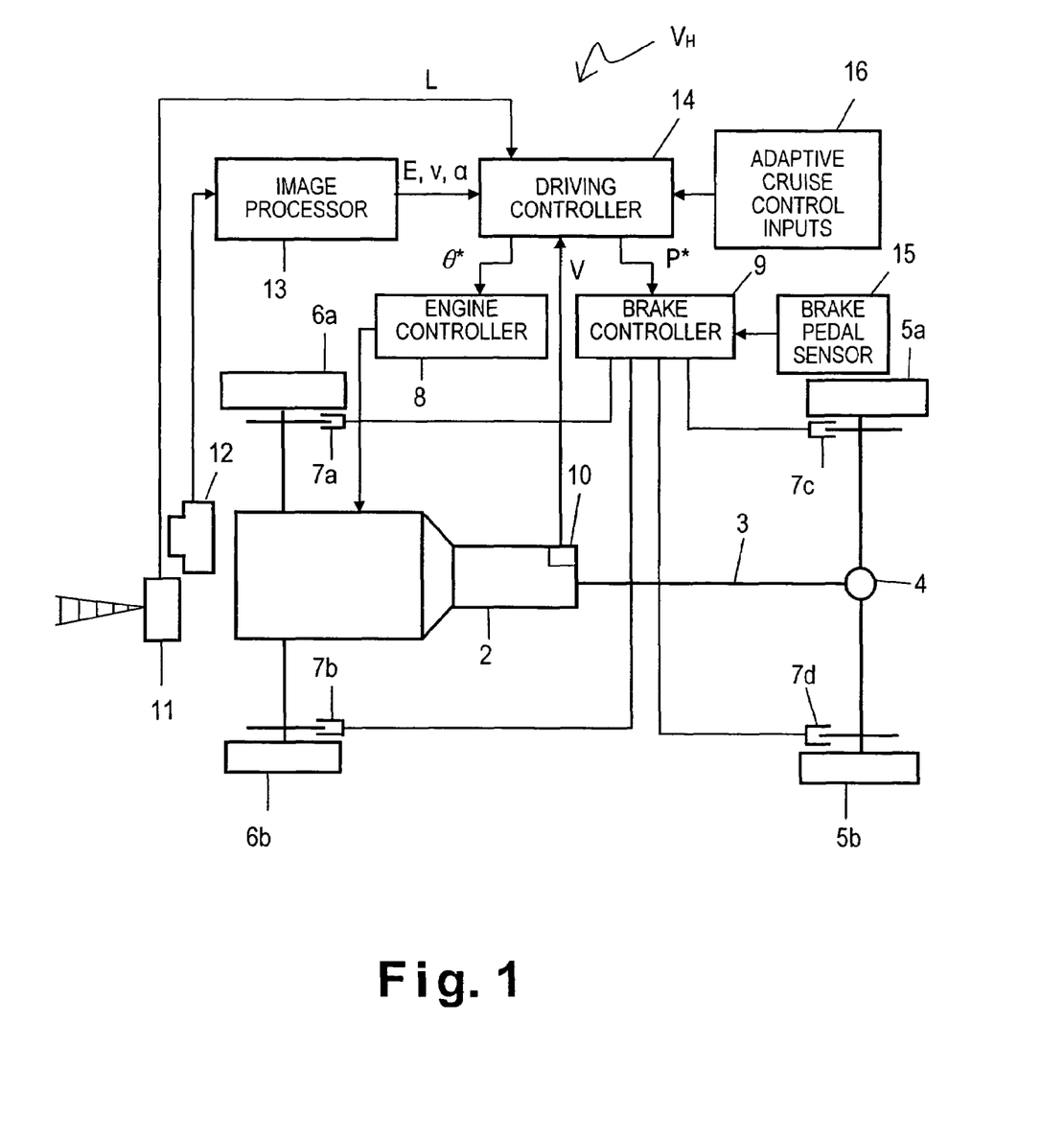
FIG. 1 is a schematic structural diagram of a vehicle equipped with a vehicle driving control device in accordance with a first embodiment of the present invention.

Referring initially to FIG. 1, a host vehicle $V_H$ is illustrated equipped with a vehicle driving control device in accordance with a first embodiment of the present invention. The vehicle driving control device is configured with a preceding vehicle following control that includes one or all of functions of a so-called adaptive cruise control (ACC). The phrase "preceding vehicle following control" as used herein refers to performing inter-vehicle distance control and performing vehicle speed control so that an inter-vehicle distance will be maintained to a prescribed or set value when a preceding vehicle is determined to be present in front of the host vehicle $V_H$, and so that the vehicle speed be maintained to a prescribed or set value when no preceding vehicle is present.

This host vehicle $V_H$ includes, among other things, an engine 1, an automatic transmission 2, a propeller shaft 3, a final drive 4, a pair of rear drive wheels 5a and 5b, a pair of front driven wheels 6a and 6b, and a plurality of disc brakes 7a to 7d. The engine 1 is a conventional internal combustion engine that acts as a main drive source, which transmits a drive force to the drive wheels 5a and 5b through the automatic transmission 2, the propeller shaft 3, and the final drive 4 in a conventional manner. The wheels 6a, 6b, 5a and 5b are fitted with the disc brakes 7a to 7d, respectively.

The host vehicle $V_H$ further includes, among other things, an engine controller 8, a brake controller 9, a vehicle speed sensor 10, an inter-vehicle distance sensor 11, a camera 12, an image processor 13, a driving controller 14, a brake pedal sensor 15 and adaptive cruise control inputs 16. The vehicle driving control device in accordance with a first embodiment of the present invention preferably includes the components 8-16.

The engine controller 8, the brake controller 9 and the driving controller 14 are preferably part of one or more microcomputers that are configured with control programs that control the host vehicle $V_H$ as discussed below. These controllers 8, 9 and 14 also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for these controllers 8, 9 and 14 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine 1 is operatively coupled to the engine controller 8. The engine controller 8 controls the torque and speed of the engine 1 by controlling the throttle valve opening, fuel injection, ignition timing, and so forth of the engine 1 according to a throttle valve opening command value $\theta^*$ from the driving controller 14.

The disc brakes 7a to 7d are operatively coupled to the brake controller 9. The brake controller 9 is configured to conduct automatic braking control when in the driving controller 14 is conducting the preceding vehicle following control of the adaptive cruise control. The brake controller 9 generates brake hydraulic pressure according to a brake pressure command value P* from the driving controller 14, and supplies this pressure to the disc brakes 7a to 7d. The brake controller 9 also generates brake hydraulic pressure according to a depression amount of a brake pedal detected by the brake pedal sensor 15, and supplies this pressure to the disc brakes 7a to 7d.

The vehicle speed sensor 10 is configured and arranged to detect the vehicle speed V that based on the rotational output provided on the output side of the automatic transmission 2. The driving controller 14 (discussed below) detects the acceleration of the host vehicle $V_H$ by differentiating the vehicle speed V detected by the vehicle speed sensor 10.

The inter-vehicle distance sensor 11 is configured and arranged to detect the inter-vehicle distance L between the host vehicle $V_H$ and a preceding vehicle. The inter-vehicle distance sensor 11 is preferably provided on the lower part of the vehicle body at the front of the host vehicle $V_H$. This inter-vehicle distance sensor 11 emits a laser beam, for example, receives the light reflected back from a preceding vehicle, and measures the inter-vehicle distance L between the host vehicle $V_H$ and the preceding vehicle. The inter-vehicle distance sensor 11 also is configured and arranged to detect the position of a preceding vehicle so as to recognize the presence of a preceding vehicle in the host vehicle lane or an adjacent vehicle lane. A scanning or multi-beam type of a laser radar device, a milliwave device, or the like can be used for the inter-vehicle distance sensor 11.

The camera 12 is configured and arranged to obtain images of an area ahead of the host vehicle $V_H$. The camera 12 is provided at a lateral center portion of the host vehicle $V_H$ such as at the top of the windshield inside the passenger compartment. This camera 12 can be a CCD camera, a CMOS camera, or the like.

The image processor 13 is configured and arranged to process the images taken by the camera 12. The image processor 13 is further configured and arranged to detect a lateral velocity v of a preceding vehicle and an acceleration α of a preceding vehicle based on the amount of displacement E of the preceding vehicle in the lateral direction (vehicle width direction), and the change in the lateral displacement E over time.

Figure 2:
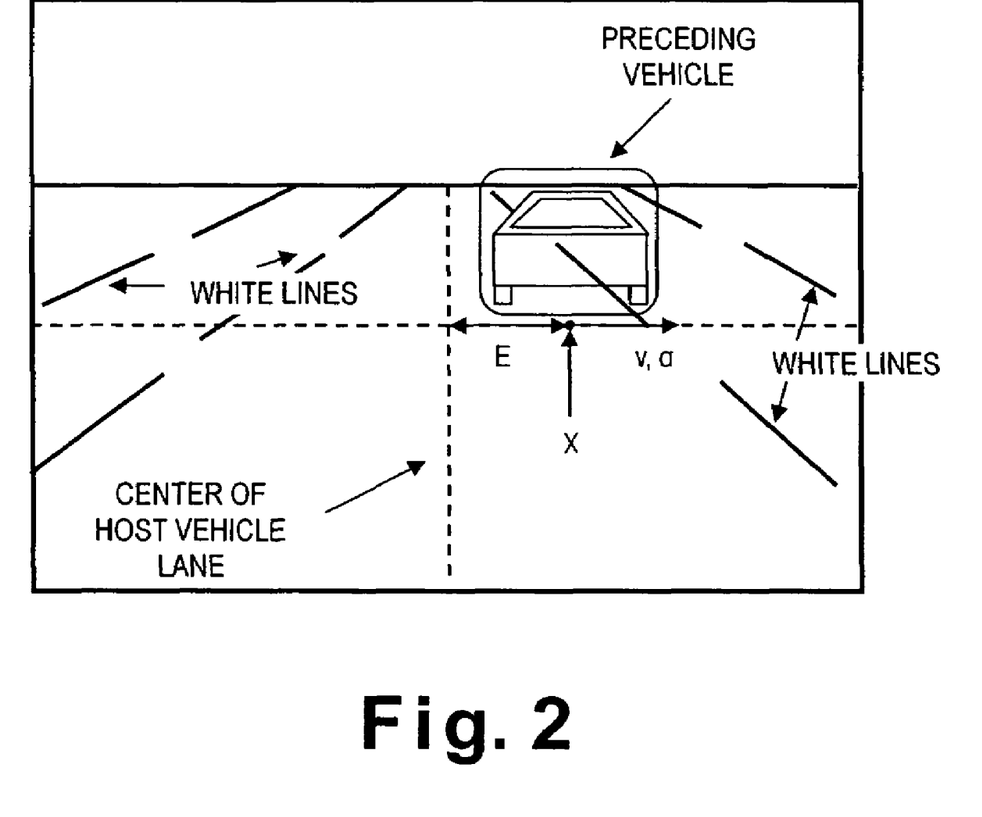
FIG. 2 is an image of the area ahead of the host vehicle as obtained by a camera of the vehicle driving control device.
Figure 3:
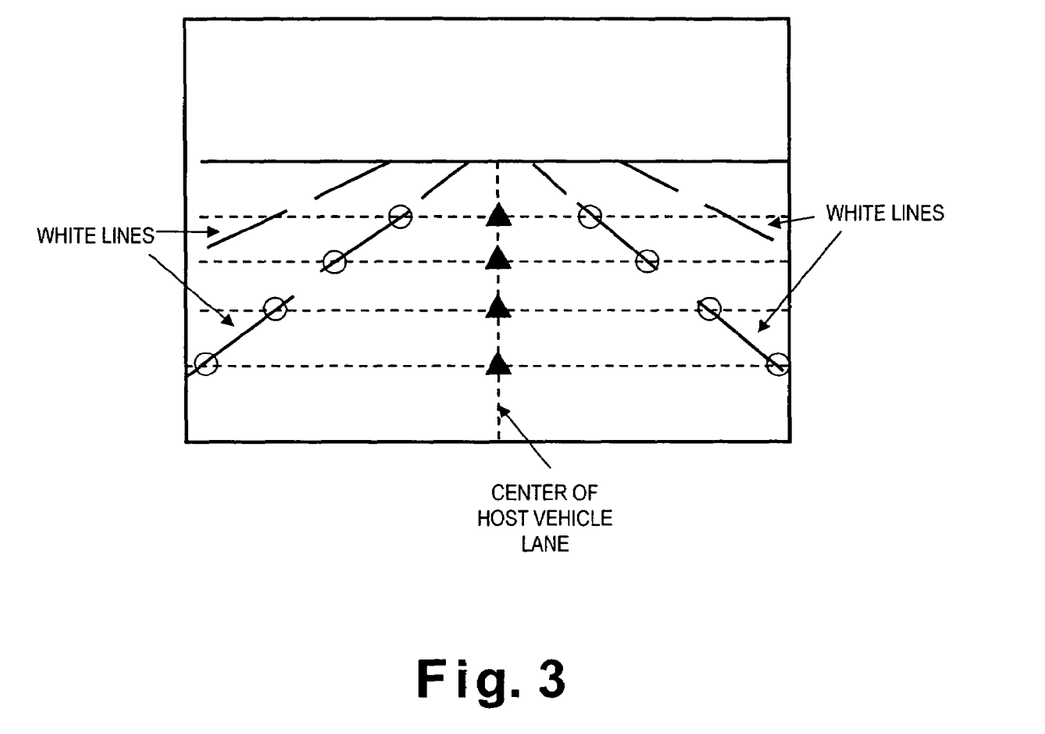
FIG. 3 is a diagram illustrating how the center line of the host vehicle lane is detected from the camera image such as the one illustrated in FIG. 2

Referring now to FIG. 2, an example of an image of the area ahead of the host vehicle $V_H$ is illustrated as taken by the camera 12. The image processor 13 processes the image taken by the camera 12. Preferably, the image processor 13 treats the preceding vehicle as lying in a single plane, and sets a vehicle position X that corresponds to the center of the preceding vehicle near the ground. The image processor 13 also detects the white lines of the host vehicle lane and the center line of the host vehicle lane, and then calculates the horizontal distance between the vehicle position X and the center of the host vehicle lane as the lateral displacement E of the preceding vehicle. The image processor 13 also detects the lateral velocity v and the acceleration α based on the change in the lateral displacement E over time. The center line of the host vehicle lane, as shown in FIG. 3, is found by calculating the center position (indicated by triangles in the drawing) in the horizontal direction between the left and right white lines. In this embodiment, the displacement of the preceding vehicle to the right is assumed to be positive, and the displacement to the left negative. The lateral displacement E, the lateral velocity v, and the lateral acceleration α of the preceding vehicle can be detected by a known image processing method, such as that disclosed in Japanese Laid-Open Patent Application No. H10-208047. Since this image processing method is known and other image processing method can be used to carry out the present invention, image processing method will not be described in detail in this embodiment.

The adaptive cruise control inputs 16 include various kinds of switches for performing preceding vehicle following control. The adaptive cruise control inputs 16 preferably includes a main switch for turning the preceding vehicle following control system on and off, a set switch for setting the desired vehicle speed, an accelerate switch for increasing the set vehicle speed in units of 5 km/h, for instance, a coast switch for reducing the set vehicle speed in units of 5 km/h, for instance, a cancel switch for canceling preceding vehicle following control, a selector switch for changing the set inter-vehicle distance, and so forth.

When a preceding vehicle is present, the driving controller 14 performs inter-vehicle distance control to set the inter-vehicle distance L between the host vehicle $V_H$ and the preceding vehicle to the target value L* based on the vehicle speed V detected by the vehicle speed sensor 10, the inter-vehicle distance L and the presence or absence of a preceding vehicle detected by a preceding vehicle detection section that uses various detection results including, but not limited to one or more of (1) detection results from the inter-vehicle distance sensor 11, (2) the lateral displacement E, the lateral velocity v, and the lateral acceleration α of the preceding vehicle detected by the image processor 13, and (3) the set vehicle speed Vset that is set with the adaptive cruise control inputs 16. Thus, the inter-vehicle distance L between the host vehicle $V_H$ and the preceding vehicle will be set to the target value L* when the vehicle is traveling at or below the set vehicle speed Vset. When no preceding vehicle is present, the driving controller 14 performs vehicle speed control so that the vehicle speed V will be to the set vehicle speed Vset, such that the driving controller 14 outputs the accelerator pedal opening command value θ* (the result of a control computation) to the engine controller 8 and outputs the brake pressure command value P* (the result of a control computation) to the brake controller 9 to regulate the vehicle speed V.

Figure 4:
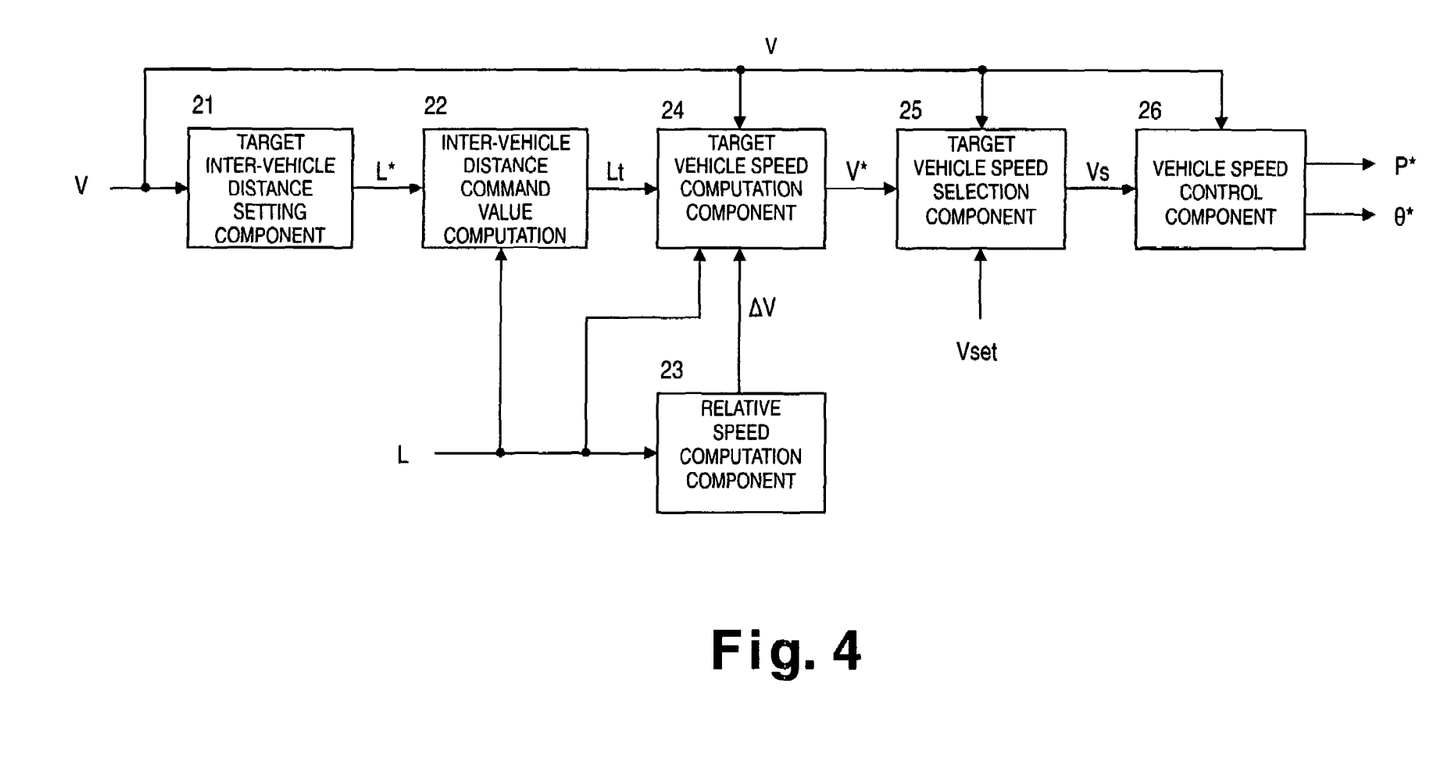
FIG. 4 is a control block diagram illustrating the functions of the driving controller of vehicle driving control device.

FIG. 4 is a control block diagram illustrating the functions of the driving controller 14. The driving controller 14 comprises a target inter-vehicle distance setting component 21, an inter-vehicle distance command value computation component 22, a relative speed computation component 23, a target vehicle speed computation component 24, a target vehicle speed selection component 25, and a vehicle speed control component 26 (all in the form of software loaded installed in a microcomputer).

The target inter-vehicle distance setting component 21 is configured to set the target inter-vehicle distance L* according to the vehicle speed V by the following Equation (1).

$$L^* = V^* T_0 + L_0 \quad (1)$$

In Equation (1), the term "$T_0$" is the inter-vehicle time, while the term "$L_0$" is the inter-vehicle distance when the vehicles are stopped. The target inter-vehicle distance L* can also be set according to the vehicle speed Vt of the preceding vehicle, rather than the vehicle speed V.

The inter-vehicle distance command value computation component 22 is configured to compute the inter-vehicle distance command value Lt which is expresses as the change over time in the inter-vehicle distance until the inter-vehicle distance L reaches the target value L*. More specifically, the target inter-vehicle distance L* is subjected to a low-pass filter Ft(s) given by the following Equation (2), and the inter-vehicle distance command value Lt is computed.

$$Ft(s) = \omega^2 / (s^2 + 2\zeta\omega s + \omega) \quad (2)$$

In Equation (2), the terms "ω" and "ζ" are a characteristic frequency and an attenuation coefficient, respectively, for converting the response characteristics in the inter-vehicle distance control system into the targeted response characteristics. The term "s" is a differentiation operator.

The relative speed computation component 23 is configured to compute the relative speed ΔV versus the preceding vehicle based on the inter-vehicle distance L from the preceding vehicle detected by the inter-vehicle distance sensor 11. More specifically, the inter-vehicle distance L is subjected to a bandpass filter Fd(s) given by the following Equation (3), and the relative speed ΔV is computed.

$$Fd(s) = \omega c^2 s / (s^2 + 2\zeta c\omega cs + \omega c^2) \quad (3)$$

In Equation (3), term "ωc" is a characteristic frequency, term "ζc" is an attenuation coefficient, and these terms are determined by the magnitude of the noise component included in the inter-vehicle distance L, and by the permissible fluctuation in short-period body longitudinal acceleration. The term "s" is a differentiation operator. The relative speed ΔV may also be computed by subjecting the inter-vehicle distance L to a high-pass filter instead of a bandpass filter.

The target vehicle speed computation component 24 is configured to compute the target vehicle speed V* for matching the inter-vehicle distance L to the inter-vehicle distance command value Lt by using a feedback compensator. More specifically, the target vehicle speed V* is computed based on the relative speed ΔV and the inter-vehicle distance L versus the preceding vehicle by the following Equation (4).

$$V^* = Vt - \{fd(Lt - L) + fv^* \Delta V\} \quad (4)$$

In Equation (4), term "fd" is the distance control gain, term "fv" is the vehicle speed control gain, and term "Vt" is the preceding vehicle speed (Vt = V + ΔV).

The target vehicle speed selection component 25 is configured to select either the target vehicle speed V*, the set vehicle speed Vset, or the current host vehicle speed V based on whether or not a preceding vehicle is present, whether or not a preceding vehicle is in a deviation tendency, and whether or not a preceding vehicle is in the midst of avoiding an obstacle, and the result is outputted as the selected target vehicle speed Vs*.

The vehicle speed control component 26 is configured to compute a target braking force $F_0r$ for matching the vehicle speed V to the selected target vehicle speed Vs*. The vehicle speed control component 26 is also configured to determine the throttle valve opening command value θ* and the braking pressure command value P* based on the target braking force $F_0r$, and then output the result to the engine controller 8 and the brake controller 9.

Figure 5:
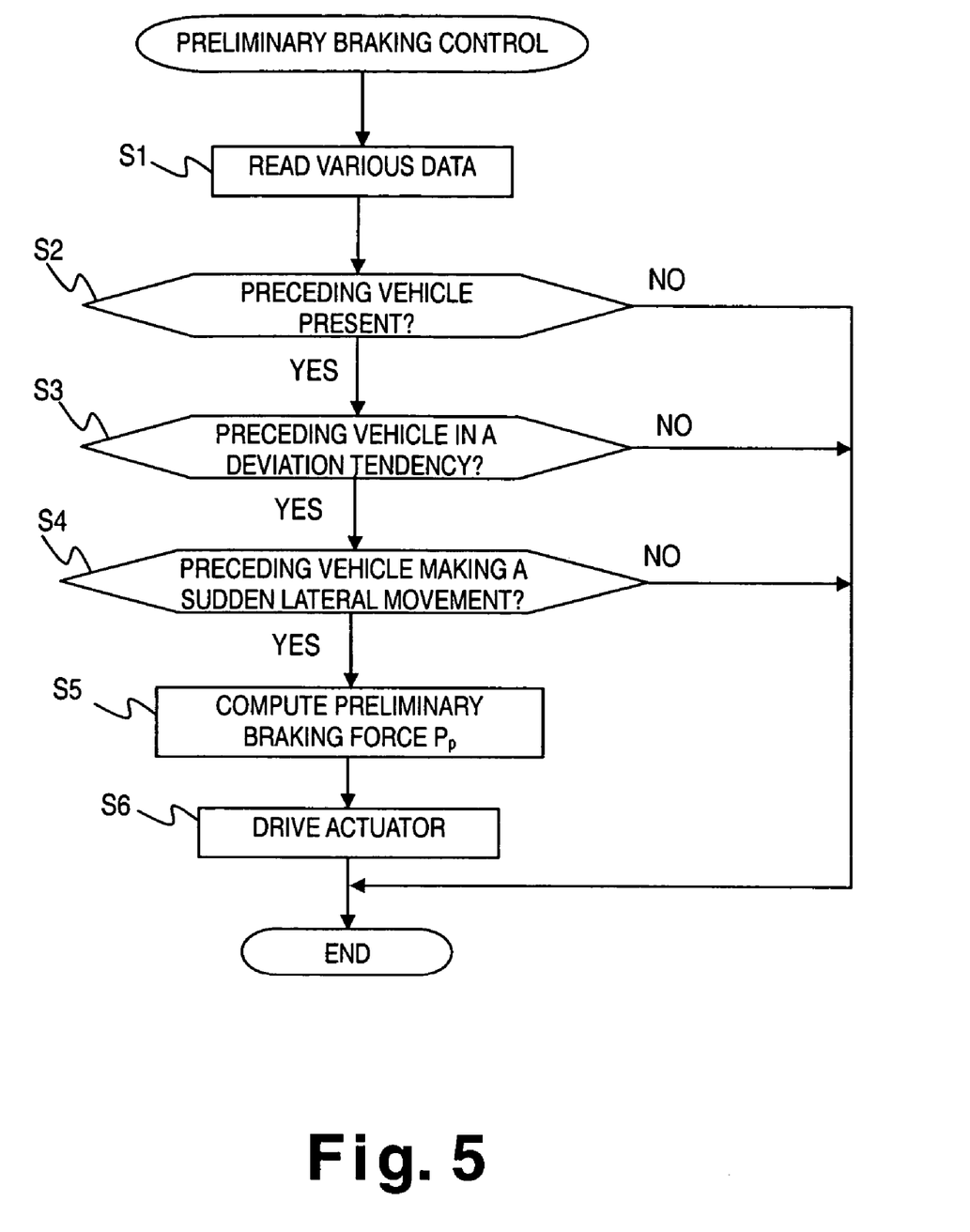
FIG. 5 is a flowchart illustrating the preliminary braking force control executed by the vehicle driving control device in accordance with the first embodiment of the present invention.

FIG. 5 is a flowchart illustrating the preliminary braking force control program in a first embodiment. This flowchart will be used to describe the operation in the first embodiment. The driving controller 14 executes the preliminary braking force control program shown in FIG. 5 every 10 msec, for instance, when the main switch of the adaptive cruise control inputs 16 is turned on.

In step S1, the various data needed for preliminary braking force control is read by the driving controller 14. This data includes the operation status of the adaptive cruise control inputs 16, whether a preceding vehicle is present in the host vehicle lane and the inter-vehicle distance L detected by the inter-vehicle distance sensor 11, the lateral displacement E, the lateral velocity v, and the lateral acceleration α detected by the camera 12 and the image processor 13, and the amount of operation θ of the accelerator pedal 18 detected by an accelerator pedal sensor 17.

In step S2, the driving controller 14 confirms whether or not a preceding vehicle has been detected in the host vehicle lane by the inter-vehicle distance sensor 11. If there is no preceding vehicle in the host vehicle lane, there is no need to apply preliminary braking force, so processing is concluded. If a preceding vehicle is present in the host vehicle lane, the program proceeds to step S3. In step S3, the driving controller 14 confirms whether or not the preceding vehicle is in a tendency to deviate from the host vehicle lane.

Figure 6:
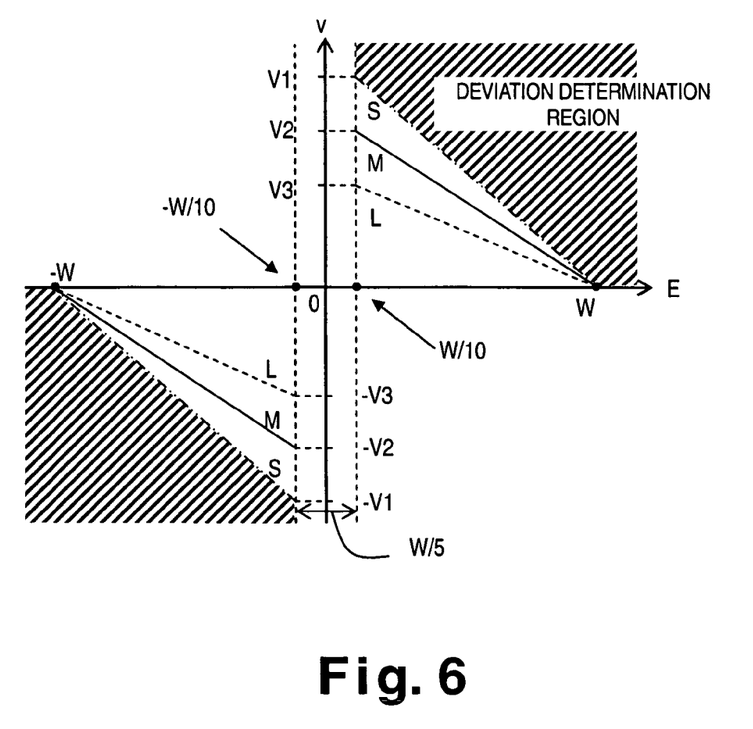
FIG. 6 is a preceding vehicle deviation determination map used by the vehicle driving control device for determining if the preceding vehicle has a lane deviation tendency.

The tendency of a preceding vehicle to deviate from the host vehicle lane will now be described. FIG. 6 is a lateral deviation determination map for a preceding vehicle. In this graph, the horizontal axis of the map is the lateral displacement E from the center of the host vehicle lane to the lateral center X of the preceding vehicle, and the vertical axis is the lateral velocity v of the preceding vehicle. A boundary S for determining preceding vehicle deviation is set in the deviation determination map for each of the lateral directions. These boundaries S are defined by a line connecting the map coordinates ($\pm W/10$, $\pm V1$) having a lateral displacement E that is $\pm 1/10$ of the host vehicle lane width W and a lateral velocity v that is a relatively large specific value of $\pm V1$, and the map coordinates ($\pm W$, 0) having a lateral displacement E that is equal to the host vehicle lane width W and a lateral velocity v equal to zero.

When the absolute value of either the lateral displacement E or the lateral velocity v is so great that this boundary S is exceeded, the driving controller 14 determines that the preceding vehicle is in a tendency to deviate from the host vehicle lane. When the lateral displacement |E| is less than $1/10$ of the host vehicle lane width W in either lateral direction, the driving controller 14 is determined that the preceding vehicle is not in a deviation tendency, regardless of the lateral velocity v. The boundaries S for determining preceding vehicle deviation is preferably set by various experimentation to a suitable boundaries at which the driver will recognize deviation of a preceding vehicle, and the shape thereof is not limited to a straight line. As shown in FIG. 6, the boundaries can be varied according to the set inter-vehicle distance or the target inter-vehicle distance L* versus the preceding vehicle. Specifically, the driving controller 14 can more easily determine that the preceding vehicle is in a deviation tendency if the boundaries S are changed to boundaries M or boundaries L, at which the longer is the set inter-vehicle distance or the target inter-vehicle distance L*, the smaller is the threshold value (absolute value) V2 or V3 of the lateral velocity v.

Also, the deviation of the preceding vehicle can be determined based solely on the lateral displacement E of the preceding vehicle. For example, the driving controller 14 determines that a preceding vehicle is in a deviation tendency from the host vehicle lane if the lateral displacement E of the preceding vehicle goes over a specific value $W_0$ that is impossible during normal driving.

In step S3 of FIG. 5, when the preceding vehicle is not in a deviation tendency from the host vehicle lane, there is no need to apply preliminary braking force, so the processing is concluded. On the other hand, if the preceding vehicle is in a deviation tendency from the host vehicle lane, the program proceeds to step S4. In step S4, the driving controller 14 confirms whether or not the preceding vehicle is making a sudden lateral movement.

The method for determining a sudden lateral movement by the preceding vehicle will now be described. When the absolute lateral acceleration |α| of the preceding vehicle is at least a specific value αA, the driving controller 14 determines that the preceding vehicle is making a sudden lateral movement in order to avoid an obstacle. The specific value αA is decided in advance through experimentation. The program can be set up so that the higher is the vehicle speed V, the lower the specific value αA is set, so as to avoid approaching a preceding vehicle that is avoiding an obstacle by making a sudden lateral movement.

Also, determination of the sudden lateral movement of a preceding vehicle can be performed based on the absolute lateral displacement |E| and the absolute lateral acceleration |α| of the preceding vehicle. In the two-dimensional map of the absolute lateral displacement |E| and the absolute lateral acceleration |α| of a preceding vehicle shown in FIG. 7, when the absolute lateral displacement |E| is at least a specific value EA and the absolute lateral acceleration |α| is at least a specific value αA, the driving controller 14 determines that the preceding vehicle is making a sudden lateral movement in order to avoid an obstacle. The specific values αA and EA are decided in advance by experimentation or the like. The program of the driving controller 14 can be set up so that the specific value αA is set a lower as the inter-vehicle distance L becomes the shorter, the vehicle speed V becomes greater, so as to avoid approaching a preceding vehicle that is avoiding an obstacle by making a sudden lateral movement. Also, the sudden lateral movement determination region shown in the two-dimensional map for the preceding vehicle lateral displacement |E| and the lateral acceleration |α| is not limited to the region shown in FIG. 7, and a region of any shape can be set.

Figure 7:
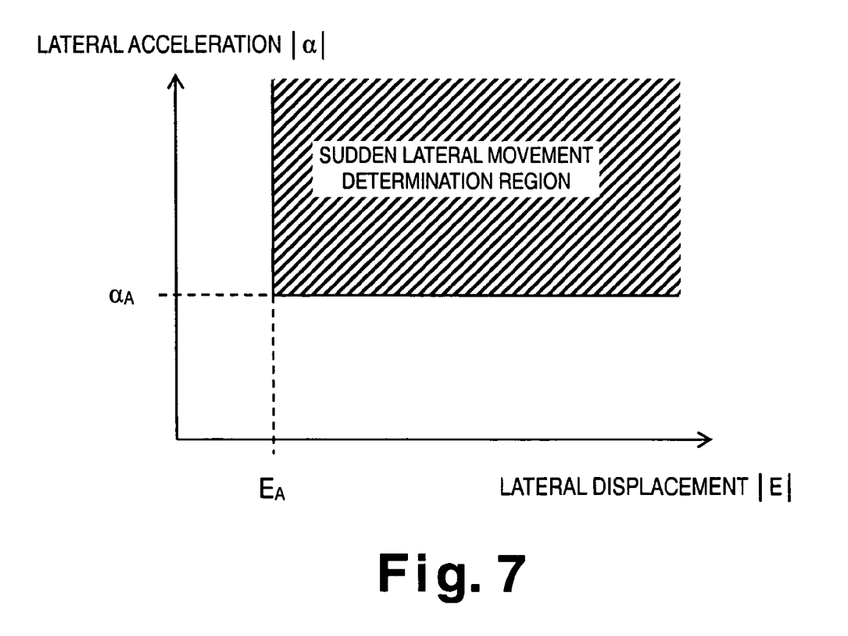
FIG. 7 is a preceding vehicle sudden lateral movement determination map used by the vehicle driving control device for determining if a sudden lateral movement has been made by the preceding vehicle.

Thus determining that a preceding vehicle is making a sudden lateral movement based on the preceding vehicle lateral displacement E and the lateral acceleration α prevents the driver of the host vehicle $V_H$ from mistakenly thinking that a sudden lateral movement is being made for the purpose of avoiding an obstacle, when in fact the erratic behavior of the preceding vehicle is caused the wheels being grabbed by a rut in the road, etc.

Figure 8:
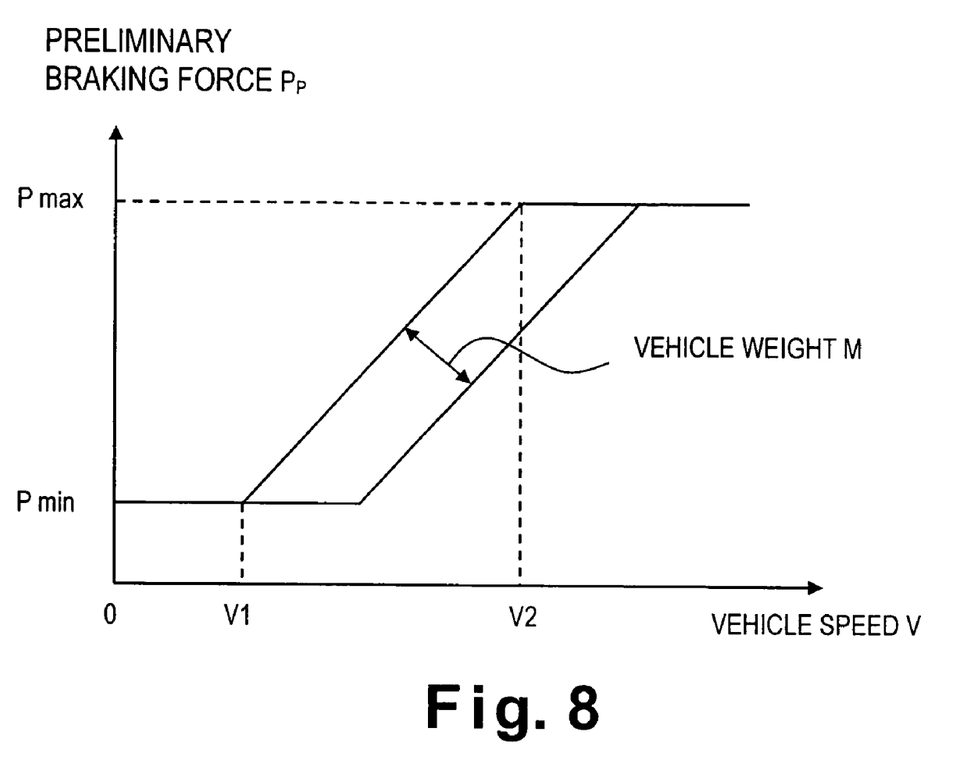
FIG. 8 shows a computation map for computing a preliminary braking force PP by the vehicle driving control device.

When the preceding vehicle is in a deviation tendency from the host vehicle lane, and the preceding vehicle is making a sudden lateral movement, the program proceeds to step S5 and the preliminary braking force $P_P$ is computed. FIG. 8 shows a computation map for computing preliminary braking force $P_P$. When a constant preliminary braking force $P_P$ is applied, the driver senses more deceleration as the vehicle speed V becomes slower. Therefore, basically, the preliminary braking force $P_P$ is set higher as the vehicle speed V becomes higher. However, when the vehicle speed V is below V1, the preliminary braking force $P_P$ remains constant at the minimum Pmin, and when the vehicle speed V is equal to V2 or higher, the preliminary braking force $P_P$ remains constant at the maximum Pmax.

Also, the free running distance becomes longer as the vehicle weight M increases. Thus, the preliminary braking force $P_P$ can be increased in proportion to the vehicle weight M. Similarly, the free running distance becomes longer as the acceleration of the vehicle increases. Thus, the preliminary braking force $P_P$ can be increased in proportion to the acceleration of the host vehicle $V_H$. Furthermore, since the driving controller 14 predicts that an obstacle will be closer as the lateral acceleration α of a preceding vehicle increases to avoid an obstacle, it is preferable to increase the preliminary braking force $P_P$ and shorten the free running distance.

Once the preliminary braking force $P_P$ has been calculated, the program proceeds to step S5 in FIG. 5, and an actuator is driven by the brake controller 9 to generate the preliminary braking force $P_P$.

Thus, with the first embodiment, the image showing the area ahead of the host vehicle $V_H$ is processed and any preceding vehicle in the host vehicle lane is recognized. The driving controller 14 then determines whether or not the preceding vehicle is making a sudden lateral movement based on this image processing result. If the driving controller 14 determines that the preceding vehicle is making a sudden lateral movement, a preliminary braking force is generated, so when a preceding vehicle makes a sudden lateral movement in order to avoid an obstacle. Since a preliminary braking force is already being applied before the driver of the host vehicle $V_H$ sees the obstacle and applies the brakes, a powerful braking force can be generated immediately even when the brakes are not operated suddenly. Thus, this control results in shortening of the free running distance.

Also, in this embodiment of the present invention, the driving controller 14 determines whether or not a preceding vehicle is in a deviation tendency from the host vehicle lane based on the result of processing the image showing the area ahead of the host vehicle $V_H$, and determines whether or not a preceding vehicle is making a sudden lateral movement. If the driving controller 14 determines that a preceding vehicle is in a deviation tendency from the host vehicle lane, and that a preceding vehicle is making a sudden lateral movement, then preliminary braking force is generated so the obstacle avoidance behavior of a preceding vehicle can be accurately determined even when the erratic behavior of a preceding vehicle is caused by its wheels being grabbed by a rut in the road, etc.

In this embodiment of the present invention, the lateral displacement of a preceding vehicle and the lateral velocity of a preceding vehicle are detected based on the result of processing the image showing the area ahead of the host vehicle $V_H$, and determines whether or not a preceding vehicle the preceding vehicle is in a deviation tendency from the host vehicle lane based on the lateral displacement and the lateral velocity of the preceding vehicle, so deviation of a preceding vehicle from the host vehicle lane can be accurately determined even when the erratic behavior of a preceding vehicle is caused by its wheels being grabbed by a rut in the road, etc.

Second Embodiment

Figure 9:
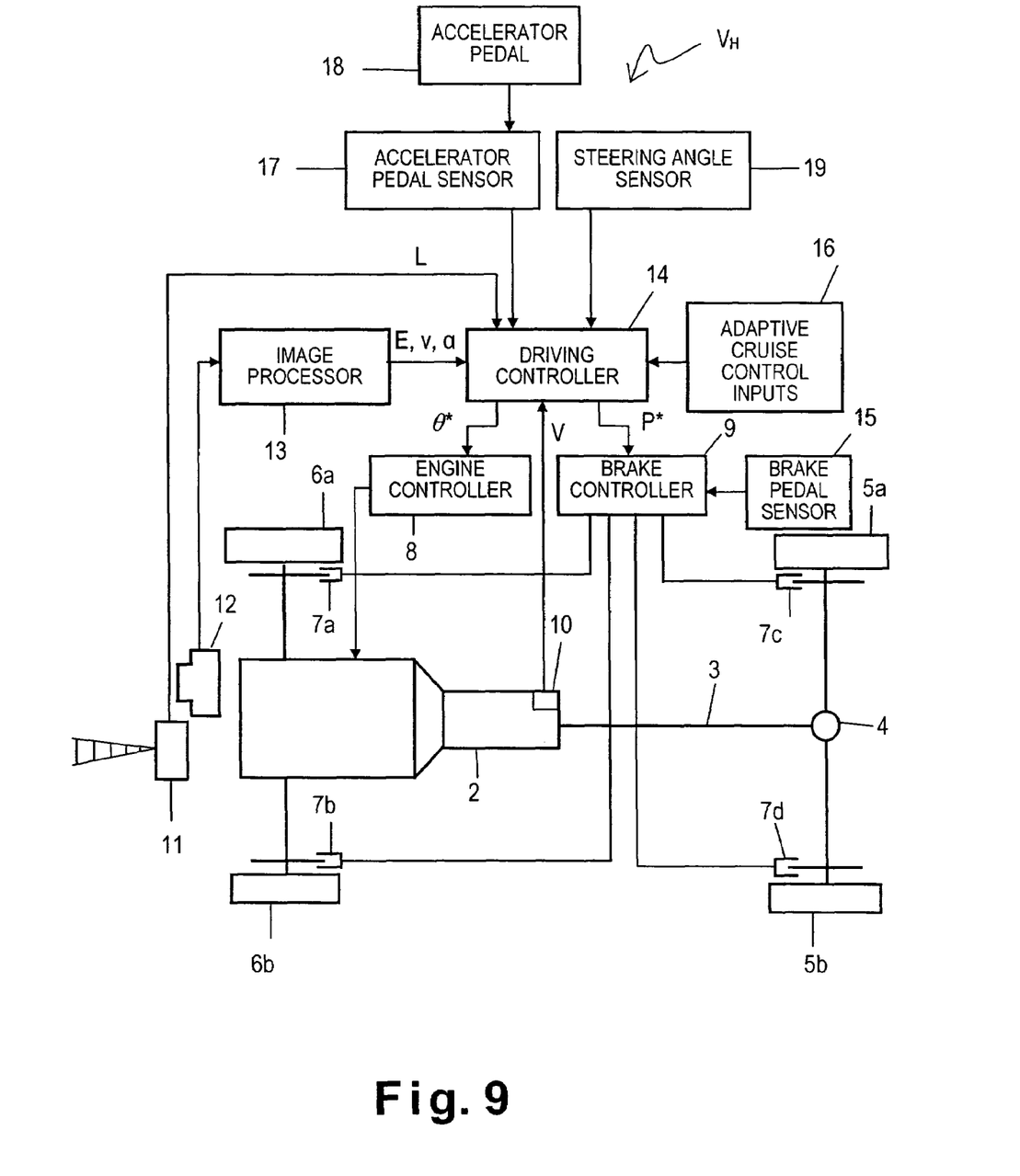
FIG. 9 is a schematic structural diagram of a vehicle equipped with a vehicle driving control device in accordance with a second embodiment of the present invention.

A second embodiment of the driving controller 14 relating to the cancellation of the preliminary braking force $P_P$ will now be described. FIG. 9 is a diagram illustrating the constitution of this second embodiment. Those components that are the same as those shown in FIG. 1 are numbered the same, and the description here will focus on the differences. The accelerator pedal sensor 17 detects the amount of operation θ of the accelerator pedal 18, and a steering angle sensor 19 detects the steering angle S of the steering wheel.

Figure 10:
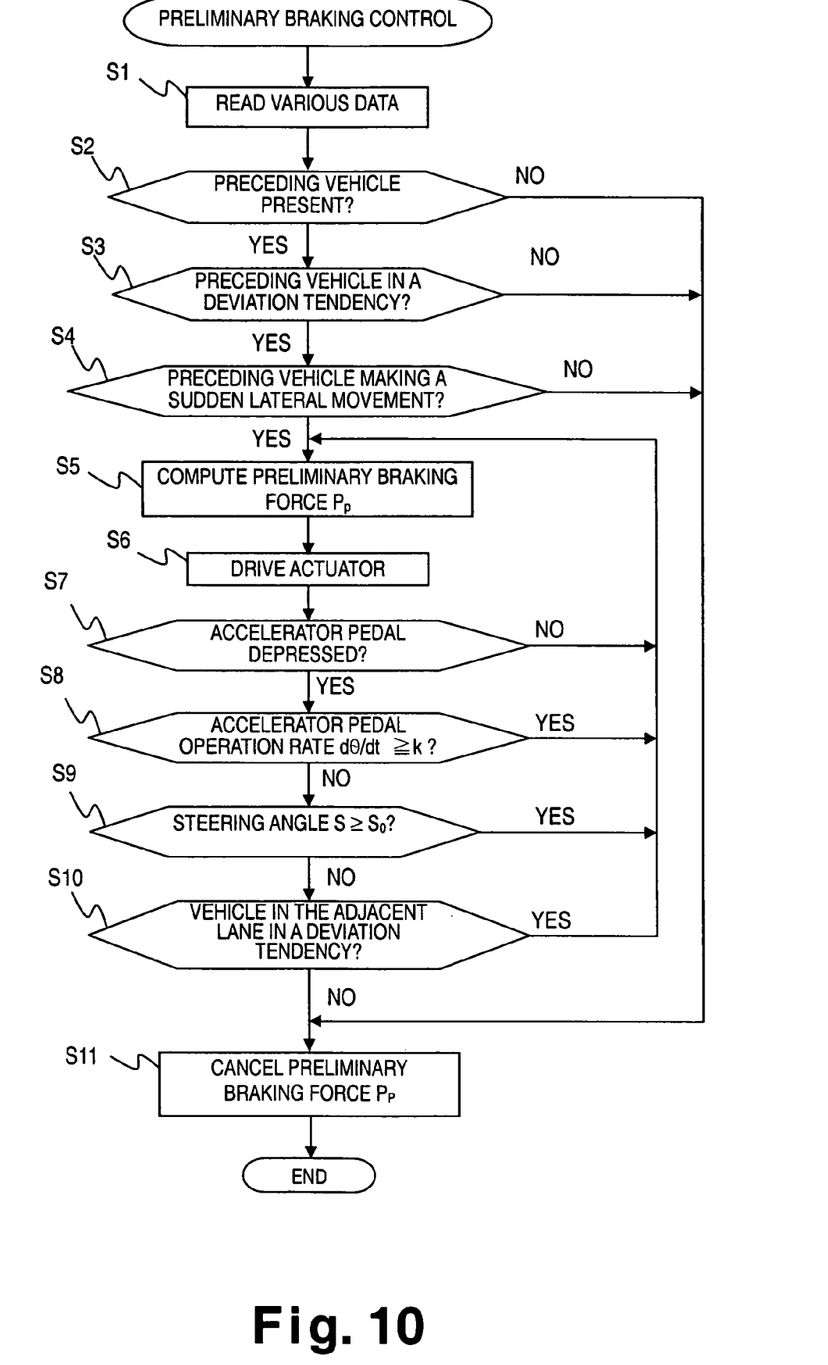
FIG. 10 is a flowchart illustrating the preliminary braking force control executed by the vehicle driving control device in accordance with the second embodiment of the present invention.

FIG. 10 is a flowchart illustrating the preliminary braking force control program in the second embodiment. This flowchart will be used to describe the operation in the second embodiment. Those steps in which the same processing is performed as that shown in FIG. 5 are numbered the same, and the description here will focus on the differences.

In step S7 after the preliminary braking force $P_P$ has been applied, the driving controller 14 confirms by the accelerator pedal sensor 17 whether or not the accelerator pedal 18 has been depressed. If the amount of operation θ of the accelerator pedal 18 is at least a specific value $θ_0$, then the program proceeds to step S8. Otherwise, the driving controller 14 returns to step S5, where the preliminary braking force $P_P$ is continued. An operation amount that is sufficient for the driver to perceive a sense of acceleration is set for the specific value $θ_0$.

If the accelerator pedal 18 is being depressed, the driving controller 14 confirms in step S8 whether or not the rate of operation thereof dθ/dt is at least a specific value k (that is, the operation is sudden). A value equivalent to the rate of emergency brake pedal depression is found experimentally and set as the specific value k. When there is a sudden accelerator pedal operation, it is likely that the driver has accidentally depressed the accelerator pedal instead of the brake pedal, so the program returns to step S5 and the preliminary braking force $P_P$ is continued. In this case, the preliminary braking force $P_P$ can be increased by a specific amount, or by an amount corresponding to the amount of operation θ of the accelerator pedal 18, in order to suppress acceleration caused by inadvertent depression of the accelerator pedal 18.

When the depression of the accelerator pedal 18 corresponds to a normal acceleration operation, the program proceeds to step S9. In step S9, the driving controller 14 confirms whether or not the steering angle S detected by the steering angle sensor 19 is at least a specific value $S_0$. The specific value $S_0$ is a reference value for determining if the steering is normal or is emergency steering for avoiding an obstacle ahead of the vehicle. When the driving controller 14 determines that the steering angle S corresponds to emergency steering of at least the specific value $S_0$, then the program returns to step S5, the preliminary braking force $P_P$ is continued, and the host vehicle $V_H$ is readied for emergency brake application.

Figure 11:
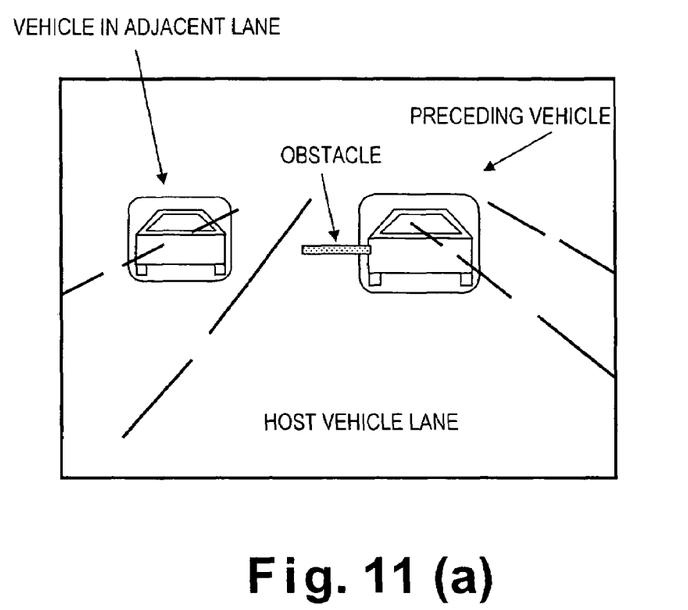
FIG. 11(a) is an image of the area ahead of the host vehicle as obtained by a camera of vehicle driving control device that shows the state when a preceding vehicle in the host vehicle lane and a vehicle in an adjacent lane are avoiding an obstacle that straddles the host vehicle lane and the adjacent lane.
FIG. 11(b) is diagram illustrating a top plan view of the state shown in FIG. 11(a) when the preceding vehicle in the host vehicle lane and a vehicle in an adjacent lane are avoiding an obstacle that straddles the host vehicle lane and the adjacent lane.

When the driving controller 14 determines that the steering operation corresponds to normal steering, the program proceeds to step S10. In step S10, the driving controller 14 confirms whether or not a vehicle traveling in the lane next to the host vehicle lane has a deviation tendency. FIG. 11(*a*) shows the image taken by the camera 12 when a preceding vehicle in the host vehicle lane and a vehicle in an adjacent lane are avoiding an obstacle that straddles the host vehicle lane and the adjacent lane, while FIG. 11(*b*) the same viewed from directly above. When there is an obstacle that straddles the host vehicle lane and the adjacent lane to the left, the preceding vehicle in the host vehicle lane avoids the obstacle by moving to the right, while the vehicle in the adjacent lane on the left avoids the obstacle by moving to the left. The determination of whether the vehicle in the adjacent lane has a deviation tendency cab be performed in the same manner as the above-mentioned determination of whether a preceding vehicle in the host vehicle lane has a deviation tendency. When the vehicle in the adjacent lane has a deviation tendency, the program proceeds to step S5, and the preliminary braking force $P_P$ is continued.

When a normal acceleration operation is performed with the accelerator pedal 18, and the steering is normal, and the vehicle in the adjacent lane has no deviation tendency, in step S11 an actuator is driven by the brake controller 9 to cancel the preliminary braking force $P_P$.

Thus, with the second embodiment, preliminary braking force is increased when an accelerator pedal operation is performed at a rate exceeding a specific value while preliminary braking force is being generated, so acceleration of the vehicle can be slowed even when the driver accidentally operates the accelerator pedal when the intent is to perform emergency braking.

Also, with the second embodiment, the preliminary braking force is canceled when an accelerator pedal operation is performed at a rate below a specific value while preliminary braking force is being generated, so preliminary braking force can be controlled in accordance with the intentions of the driver.

Further, with the second embodiment, the preliminary braking force is not canceled when the steering angle is at least a specific value, so braking with good response can be achieved and the free running distance can be shortened when the host vehicle $V_H$ takes emergency avoidance action.

With the second embodiment, the driving controller 14 determines whether or not a vehicle in an adjacent lane is in a deviation tendency from the adjacent lane based on the processing result of the image showing the area ahead of the vehicle, and then determines that the vehicle in the adjacent lane is in a deviation tendency from the adjacent lane, the preliminary braking force is canceled, so braking with good response can be achieved and the free running distance can be shortened when there is an obstacle that straddles the host vehicle lane and an adjacent lane.

The constituent elements of the claims and the constituent elements of the embodiments are in the following corresponding relationships. The camera 12 constitutes the image acquiring section. The image processor 13 constitutes the image processing section. The driving controller 14 constitutes the preceding vehicle detection section, the lateral movement determination section, the preliminary braking force control section, the deviation tendency determination section, and the adjacent lane deviation tendency determination section. The vehicle speed sensor 10 and the driving controller 14 constitute the host vehicle acceleration detection section. The accelerator pedal sensor 17 constitutes the accelerator pedal operation detection section. The steering angle sensor 19 constitutes the steering angle detection section. The various constituent elements are not limited to the above constitution, as long as the characteristic function of the present invention is not lost.

The first and second embodiments given above were examples of detecting the deviation tendency of a vehicle in an adjacent lane or a preceding vehicle in the host vehicle lane based on the result of processing with the image processor 13 of the image taken by the camera 12, However, the present invention is not limited to this, and can be configured such that the deviation tendency of a vehicle in an adjacent lane or a preceding vehicle in the host vehicle lane is detected based on a detection signal from the inter-vehicle distance sensor 11, for example.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving control device comprising:
   a preceding vehicle detection section configured to detect a lateral position of a preceding vehicle in a host vehicle lane;
   a lateral movement determination section configured to detect a parameter of the preceding vehicle indicating a lateral movement of the preceding vehicle with respect to the host vehicle lane exceeding a threshold value based on the lateral position detected by the preceding vehicle detection section; and
   a preliminary braking force control section configured to generate a preliminary braking force upon determination by the lateral movement determination section that the parameter of the preceding vehicle exceeds the threshold value.

2. The vehicle driving control device according to claim 1, wherein
   the preceding vehicle detection section includes
      an image acquiring section configured to obtain images of a forward area of a vehicle; and
      an image processing section configured to process the images obtained by the image acquiring section to recognizing the preceding vehicle in the host vehicle lane and detect the lateral position of the preceding vehicle.

3. The vehicle driving control device according to claim 1, wherein
   the lateral movement determination section is configured to detect a lateral acceleration of the preceding vehicle as the parameter of the preceding vehicle indicating the lateral movement of the preceding vehicle with respect to the host vehicle lane.

4. The vehicle driving control device according to claim 1, wherein
   the lateral movement determination section is configured to detect a lateral displacement and a lateral acceleration of the preceding vehicle as the parameter of the preceding vehicle indicating the lateral movement of the preceding vehicle with respect to the host vehicle lane.

5. The vehicle driving control device according to claim 1, further comprising
   a deviation tendency determination section configured to determine if the preceding vehicle is tending to deviate from the host vehicle lane based on detection result of the preceding vehicle detection section, and
   the preliminary braking force control section being further configured to generate the preliminary braking force upon determination by the deviation tendency determination section that the preceding vehicle is tending to deviate from the host vehicle lane, and upon determination by the lateral movement determination section that the parameter of the preceding vehicle exceeds the threshold value.

6. The vehicle driving control device according to claim 5, wherein
   the deviation tendency determination section is configured to detect a lateral displacement of the preceding vehicle based on detection results of the preceding vehicle detection section, and determine if the preceding vehicle is tending to deviate from the host vehicle lane based on the lateral displacement of the preceding vehicle.

7. The vehicle driving control device according to claim 5, wherein
the deviation tendency determination section is configured to detect a lateral displacement and a lateral velocity of the preceding vehicle based on the detection result of the preceding vehicle detection section, and determine if the preceding vehicle is tending to deviate from the host vehicle lane.

8. The vehicle driving control device according to claim 1, further comprising
a host vehicle acceleration detection section configured to detect a driving acceleration of the host vehicle, and
the preliminary braking force control section being configured to increase the preliminary braking force proportionally to the acceleration of the host vehicle detected by the host vehicle acceleration detection section.

9. The vehicle driving control device according to claim 1, wherein
the preliminary braking force control section is configured to detect a lateral acceleration of the preceding vehicle based on detection results of the preceding vehicle detection section, and increase the preliminary braking force proportionally to the lateral acceleration of the preceding vehicle.

10. The vehicle driving control device according to claim 1, further comprising
an accelerator pedal operation detection section configured to detect an operation amount of an accelerator pedal, and
the preliminary braking force control section being configured to find an accelerator pedal operation rate based on the operation amount of the accelerator pedal detected by the accelerator pedal operation detection section, and increase the preliminary braking force when the accelerator pedal has been operated at over a specific rate when preliminary braking force is being generated.

11. The vehicle driving control device according to claim 10, wherein
the preliminary braking force control section is configured to cancel the preliminary braking force when the accelerator pedal has been operated at below the specific rate when the preliminary braking force is being generated.

12. The vehicle driving control device according to claim 11, further comprising
a steering angle detection section configured to detect a steering angle, and
the preliminary braking force control section being configured to prohibit cancellation of the preliminary braking force when the steering angle detected by the steering angle detection section is at least a specific value.

13. The vehicle driving control device according to claim 11, further comprising
an adjacent lane deviation tendency determination section configured to determine if a vehicle in an adjacent lane is tending to deviate from the adjacent lane based on detection results of the preceding vehicle detection section,
the preliminary braking force control section configured to prohibit cancellation of the preliminary braking force upon determination by the adjacent lane deviation tendency determination section that a vehicle in an adjacent lane is tending to deviate from the adjacent lane.

14. The vehicle driving control device according to claim 10, wherein
the preceding vehicle detection section includes
an image acquiring section configured to obtain images of a forward area of a vehicle; and
an image processing section configured to process the images obtained by the image acquiring section to recognizing the preceding vehicle in the host vehicle lane and detect the lateral position of the preceding vehicle.

15. The vehicle driving control device according to claim 10, wherein
the lateral movement determination section is configured to detect a lateral acceleration of the preceding vehicle as the parameter of the preceding vehicle indicating the lateral movement of the preceding vehicle with respect to the host vehicle lane.

16. The vehicle driving control device according to claim 10, wherein
the lateral movement determination section is configured to detect a lateral displacement and a lateral acceleration of the preceding vehicle as the parameter of the preceding vehicle indicating the lateral movement of the preceding vehicle with respect to the host vehicle lane.

17. The vehicle driving control device according to claim 11, wherein
the lateral movement determination section is configured to detect a lateral acceleration of the preceding vehicle as the parameter of the preceding vehicle indicating the lateral movement of the preceding vehicle with respect to the host vehicle lane.

18. The vehicle driving control device according to claim 11, wherein
the lateral movement determination section is configured to detect a lateral displacement and a lateral acceleration of the preceding vehicle as the parameter of the preceding vehicle indicating the lateral movement of the preceding vehicle with respect to the host vehicle lane.

19. A vehicle driving control device comprising:
preceding vehicle detection means for detecting a lateral position of a preceding vehicle in a host vehicle lane;
lateral movement determination means for detecting a parameter of the preceding vehicle indicating a lateral movement of the preceding vehicle with respect to the host vehicle lane exceeding a threshold value based on the lateral position detected by the preceding vehicle detection means; and
preliminary braking force control means for generating preliminary braking force upon determination by the lateral movement determination means that the parameter of the preceding vehicle exceeds the threshold value.

20. A method of controlling a host vehicle comprising:
detecting a lateral position of a preceding vehicle in a host vehicle lane ahead of the host vehicle;
detecting a parameter of the preceding vehicle indicating a lateral movement of the preceding vehicle with respect to the host vehicle lane exceeding a threshold value based on the lateral position of the preceding vehicle; and
generating preliminary braking force upon determination that the parameter of the preceding vehicle exceeds the threshold value.

* * * * *